United States Patent [19]
Spencer, deceased et al.

[11] 3,742,914
[45] July 3, 1973

[54] COMBINATION BIRD SHELTER AND FEEDER

[76] Inventors: Joseph T. Spencer, deceased, late of Mount Morris, Mich.; by Charles Nelson, Jr., 2515 S. Dye Road, Flint, Mich. 48504, administrator

[22] Filed: Feb. 25, 1970

[21] Appl. No.: 13,979

Related U.S. Application Data

[62] Division of Ser. No. 805,985, Feb. 24, 1969, Pat. No. 3,505,975.

[52] U.S. Cl. ............................................. 119/52
[51] Int. Cl. .................. A01k 39/00, A01k 31/00
[58] Field of Search ....................... 119/52, 61, 23

[56] References Cited
UNITED STATES PATENTS

| | | |
|---|---|---|
| 1,066,710 | 7/1913 | Clarke ............... 119/52 R |
| 1,851,846 | 3/1932 | Kegler ................... 119/61 |
| 421,465 | 2/1890 | Woodworth ......... 119/52 R |
| 843,792 | 2/1907 | Boyd .................. 119/52 R |
| 1,855,781 | 4/1932 | Tolley ..................... 119/61 |
| 3,295,498 | 1/1967 | Brown ..................... 119/23 |

*Primary Examiner*—Hugh R. Chamblee
*Attorney*—Learman, Learman & McCulloch

[57] ABSTRACT

A bird feeder having an undulating canopy member having a pair of upwardly concave portions spaced by a central, upwardly convex portion, the terminal ends of each of the upwardly concave portions being bent upwardly to form food troughs. A food reservoir is mounted atop the canopy having openings therein through which food may be supplied automatically to the troughs.

4 Claims, 3 Drawing Figures

PATENTED JUL 3 1973   3,742,914

INVENTOR.
Joseph T. Spencer, by
Charles Nelson, Jr., Administrator,
BY
Learman, Learman & McCulloch

COMBINATION BIRD SHELTER AND FEEDER

This application is a division of application Ser. No. 805,985, filed Feb. 24, 1969, now U.S. Pat. No. 3,505,975.

The invention herein disclosed relates to a bird feeder construction and more particularly to a construction in which a feeder is provided by a canopy that is shaped to provide a pair of spaced food and/or water troughs which may be supplied from a reservoir removably mounted atop the canopy between the troughs.

An object of this invention is to provide a bird feeder which is provided with a plurality of food containing receptacles.

Another object of the invention is to provide a bird feeder and food reservoir wherein the feeder and reservoir are separable from one another so as to enable the feeder to be used either with or without the reservoir.

Another object of the invention is to provide a feeder having a food reservoir which delivers food automatically to the feeder and which provides for the delivery of more than one kind of food.

Other objects and advantages of the invention will be pointed out specifically or will become apparent from the following description when it is considered in conjunction with the appended claims and the accompanying drawings, in which:

Figures 1, 2, 3:
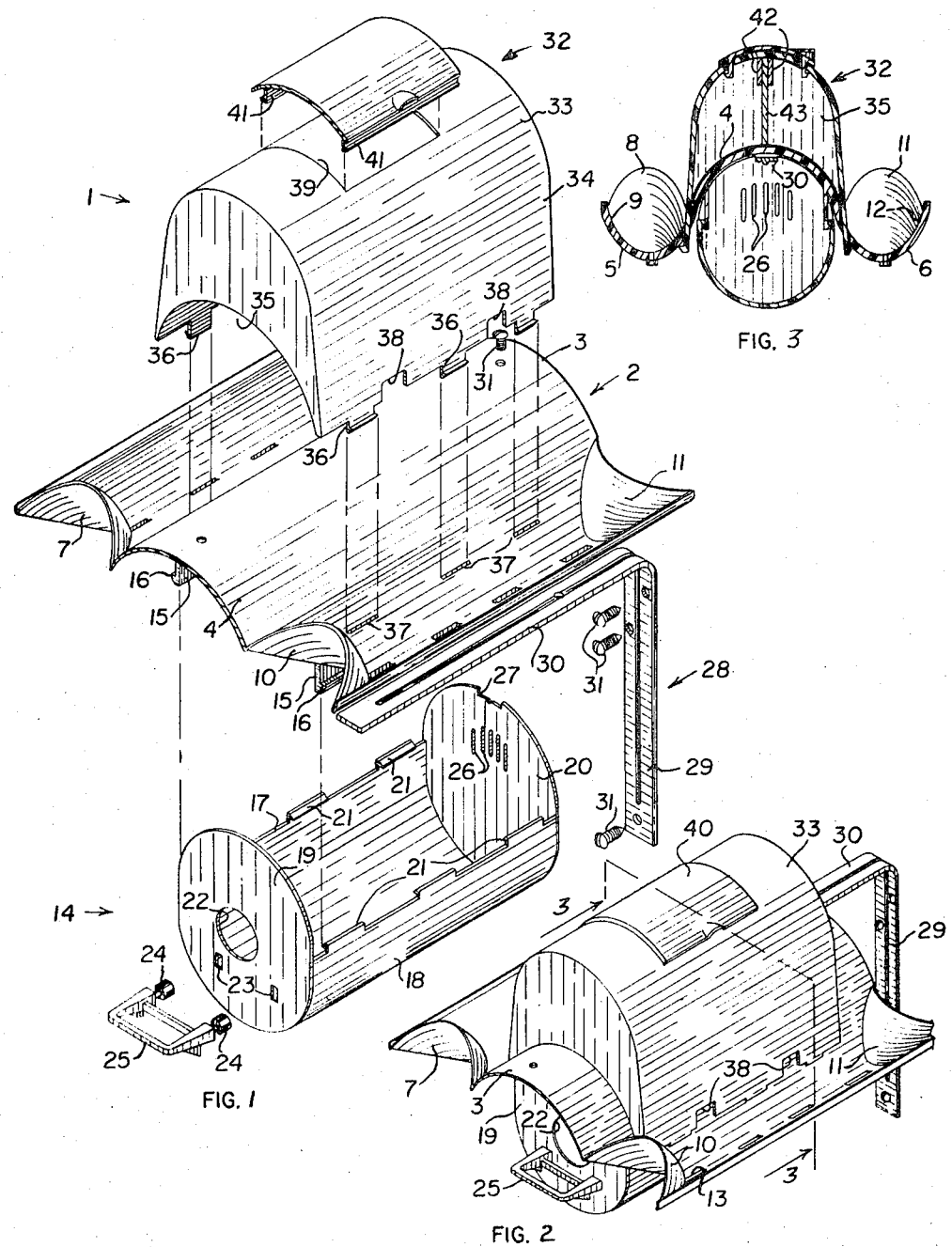
FIG. 1 is an exploded, perspective view of apparatus constructed in accordance with the invention.
FIG. 2 is a perspective view, on a reduced scale, of the apparatus shown in FIG. 1 in assembled relation.
FIG. 3 is a transverse sectional view taken on the line 3 — 3 of FIG. 2.

Apparatus constructed in accordance with the disclosed embodiment of the invention comprises a combined feeder and shelter 1 composed of a feeder 2 comprising a canopy member 3 of generally sinusoidal or undulating configuration in cross-section and having a central section 4 which is rolled to be convex upwardly. At one side of the central section 4 is a reversely curved, upwardly concave section 5. A similar upwardly concave section 6 extends from the opposite side of the section 4. The opposite ends of the arcuate portion 5 are bent upwardly and toward one another to provide end walls 7 and 8. A receptacle or trough 8 for food or water is formed, the trough having a bottom, side and end walls, and an open top. The opposite ends of the arcuate member 6 also are upturned to form end walls 10 and 11, thereby providing a second and similar receptacle or trough 12. Preferably, the lowermost part of the arcuate member 6 is provided with drainage openings 13.

Anchor means is provided on the canopy 2 so as to enable the latter to be removably secured to a shelter 14 and comprises a pair of parallel flanges 15 secured to and depending from the lower surface of the center section 4, but terminating short of the ends of the canopy. Each of the flanges 15 terminates at its free end in a laterally directed barb 16.

The shelter 14 comprises a trough-shaped hollow body 17 having a generally semicircular wall 18 at the opposite ends of which are discs 19 and 20. The free edges of the wall 18 are provided with a plurality of laterally projecting tangs 21 which may be interfitted with the barbs 16 of the flanges 15 so as to hold the canopy 3 and the shelter body 14 in assembled relation. The flanges 15 are sufficiently flexible to enable them to be deflected inwardly and thereby permit separation of the members 3 and 14 when desired.

The front disc or wall 19 has an opening 22 therein to permit ingress and egress of birds to the interior of the body. The disc 19 may have additional openings 23 to accommodate the free ends 24 of a generally U-shaped perch member 25. The perch may be assembled with and disassembled from the body 14 by snapping the perch ends 25 into and out of the openings 23.

The rear wall or disc 20 may be imperforate if desired, but it preferably is provided with a plurality of ventilating openings 26. The upper edge of the disc 20 preferably is provided with a notch 27 for a purpose presently to be explained.

The apparatus thus far described may be utilized as a combination bird feeder and shelter and may be mounted in any convenient manner. Preferably, however, the apparatus includes a mounting bracket 28 comprising a pair of right angular legs 29 and 30. The leg 30 may be inserted between the canopy section 3 and the body 14 by passing the leg 30 through the notch 27. The leg 30 may be secured to the canopy by means of a screw 31. The leg 29 may be secured to a post or other support by similar screws 31.

The apparatus also includes a food reservoir 32 comprising an inverted, trough-like body 33 having a generally U-shaped wall 34 at the opposite ends of which are closure walls 35. The free edge of each wall 35 is curved so as to correspond to the curvature of the canopy section 4. The free ends of the wall 34 are provided with barbed tangs 36 which are adapted to fit into openings 37 formed at the juncture of the canopy section 4 with the canopy sections 5 and 6. The tangs 37 are sufficiently flexible to enable the body 14 to be disassembled from the canopy 3 when desired.

Each edge of the reservoir wall 34 also is provided with a plurality of notches or recesses 38 to provide outlets which establish communication between the interior of the reservoir and the canopy portions 5 and 6 and thereby permit the contents of the reservoir to be delivered automatically to the canopy portions 5 and 6 as the demand requires.

The canopy may be provided with an opening 39 which bird food and the like may be introduced to the reservoir when the latter is in place on the canopy 3. The opening 39 may be closed by a cover 40 having barbed flanges 41 similar to the flanges 15 and which cooperate with the adjacent edges of the opening 39 to maintain the cover in assembled relation with the body 32.

Each end wall 35 of the reservoir housing 32 preferably has a pair of spaced apart, parallel guide ribs 42 between which is removably accommodated a partition 43 that spans the length of the housing 32. When in place, the partition 43 rests atop the central portion 4 of the canopy 3 and divides the interior of the housing 32 into two compartments, thereby enabling two different kinds of food to be dispensed simultaneously from the housing 32.

This disclosure is representative of a presently preferred form of the invention, but is intended to be illustrative rather than definitive thereof. The invention is defined in the claims.

I claim:

1. A feeder construction comprising a one-piece, smoothly undulating member having a pair of parallel, upwardly concave, arcuate troughs spaced apart by a central, upwardly convex arcuate portion, said central portion being formed on arc greater than that of either of said troughs, each end of each of said troughs being bent upwardly and toward the opposite end to provide a single thickness, inwardly convex end wall at each end of each of said troughs, said member having a plurality of openings therein, a hollow food reservoir mounted atop said central portion, said reservoir having at least one opening therein in communication with at least one of said troughs enabling food in said reservoir to pass therefrom into said one of said troughs, said reservoir having a plurality of anchor tabs accommodated in said openings in said member and anchoring said reservoir to said member.

2. A construction as set forth in claim 1 including partition means in said reservoir supported atop said central portion and dividing said reservoir into a plurality of compartments.

3. A construction as set forth in claim 2 wherein said partition extends longitudinally of said central portion.

4. A construction as set forth in claim 1 wherein said tabs are resilient and are provided with barbs engageable with said member.

* * * * *